Figure 1A:
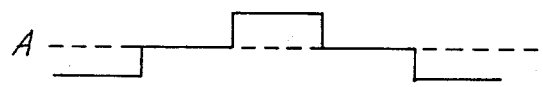

March 1, 1960     J. Z. YOUNG ET AL     2,927,219
APPARATUS FOR COUNTING DISCRETE PARTICLES
Filed Feb. 10, 1953     5 Sheets-Sheet 1
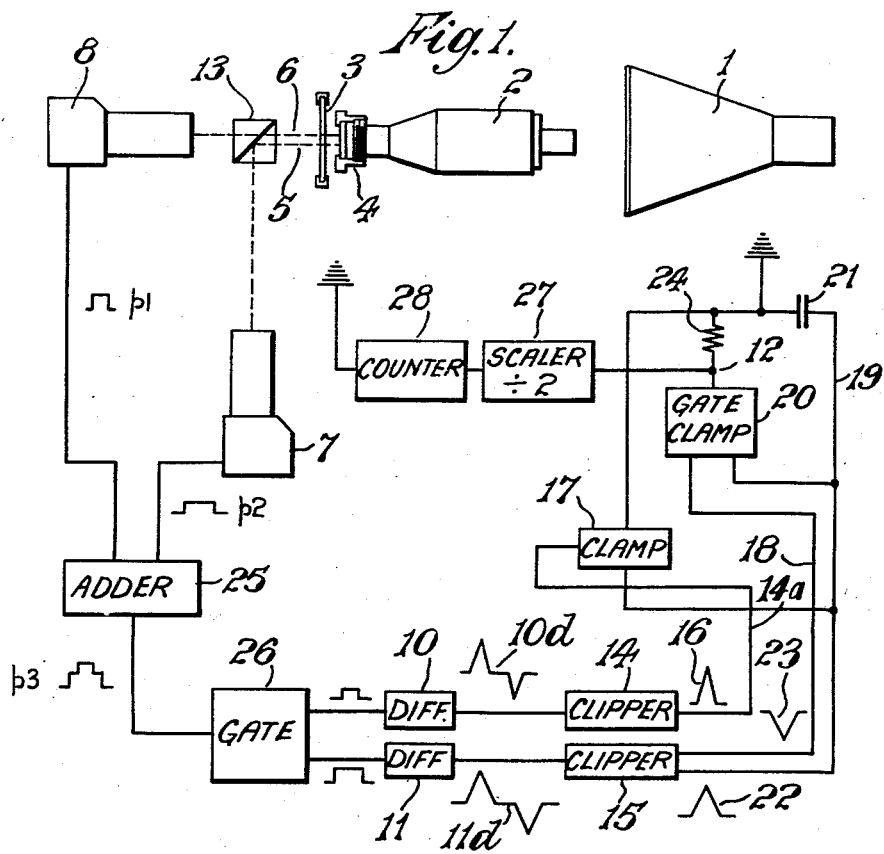
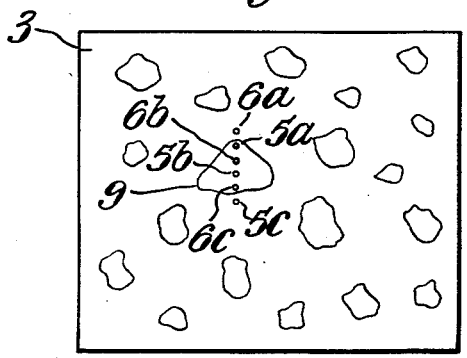
INVENTOR
John Z. Young
Francis F. W. Roberts
David J. Causley March 1, 1960  J. Z. YOUNG ET AL  2,927,219
APPARATUS FOR COUNTING DISCRETE PARTICLES
Filed Feb. 10, 1953  5 Sheets-Sheet 2

INVENTORS
J.Z. Young
F.F.W. Roberts
D.J. Causley

By Hitcock, Uithill & Bruchie
ATTORNEYS

March 1, 1960   J. Z. YOUNG ET AL   2,927,219
APPARATUS FOR COUNTING DISCRETE PARTICLES
Filed Feb. 10, 1953   5 Sheets-Sheet 3
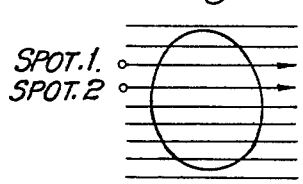
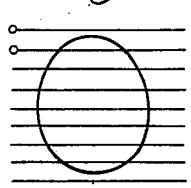
Fig.3.   Fig.4.
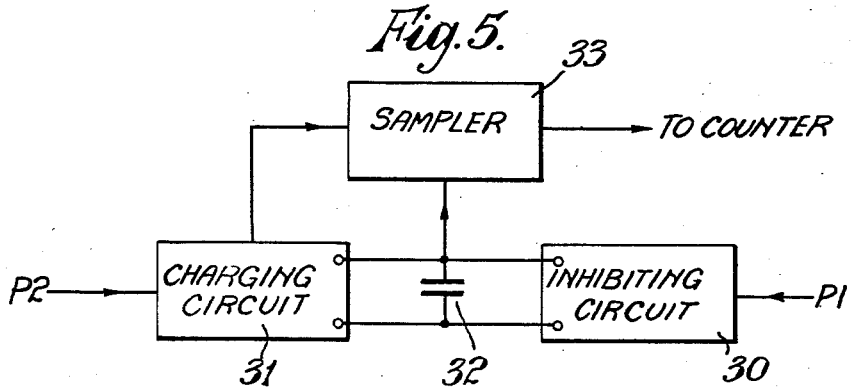
Fig.5.
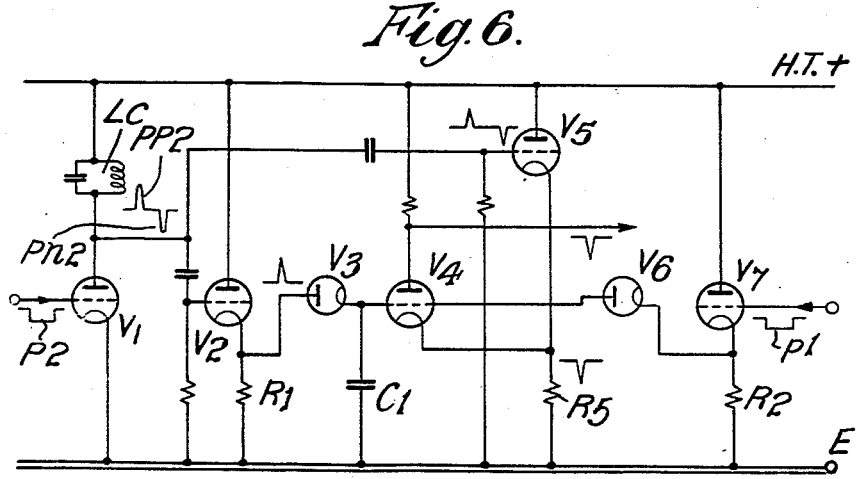
Fig.6.
INVENTOR
John Z. Young
Francis F. W. Roberts
David J. Causley
By
Holcombe Wetherill & Brenbois

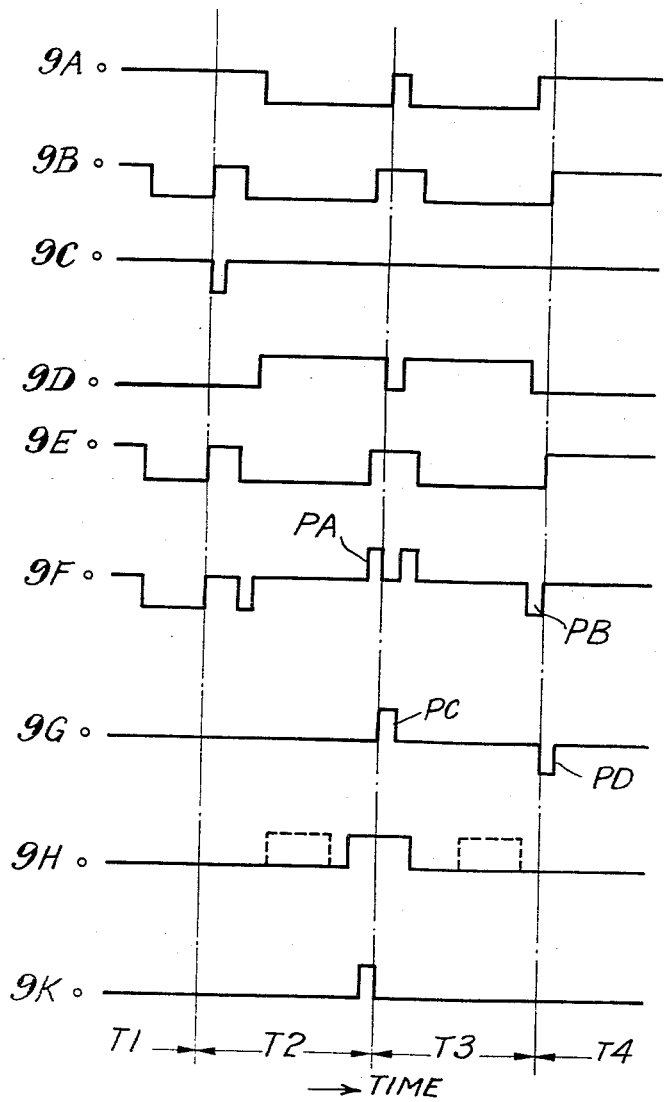

United States Patent Office 2,927,219
Patented Mar. 1, 1960

2,927,219

APPARATUS FOR COUNTING DISCRETE PARTICLES

John Zachary Young and Francis Frederick William Roberts, London, and David James Causley, Ilford, England Application February 10, 1953, Serial No. 336,182

Claims priority, application Great Britain February 13, 1952

2 Claims. (Cl. 250—220)

This invention relates to a method of and apparatus for counting and sizing discrete particles situated in or projected on a field of view, by means of a flying spot which is arranged to scan this field of view in a raster comprising a succession of substantially parallel lines. While various methods have hitherto been proposed for using the flying spot technique to count and size particles, such methods have not been successfully applied to assemblages or particles of differing shape and random size distribution.

According to the present invention in a method of counting or sizing discrete microscopic particles situated in or projected on a field of view, the field is scanned in lines by at least two spots forming a composite beam, the lines being separated in the direction perpendicular to the direction of scanning by a distance less than the dimension in that direction of the smallest particle to be counted and the spots being separated by a distance substantially equal to the distance between adjacent scanning lines and in which electric signals produced photoelectrically on interception of said beams by a particle are used to operate counting and/or sizing means.

In one method according to the invention a beam of light is projected to produce a light spot of disired dimensions and optical means are employed to produce from said spot beams spaced as desired, further optical means such as a polarising cube, being employed to change the direction of one of said spaced beams with respect to the other after the field has been scanned.

In another method according to the invention the field is subjected to magnification by an electron microscope and the magnified image is scanned by an electron beam, which during scanning is rapidly deflected at right angles to the direction of scan by a switching pulse of square wave form applied to beam deflecting means to produce said composite beam.

In a further method according to the invention the field to be scanned is projected on to the screen of a cathode ray camera tube, the electron beam of which, during scanning, is rapidly deflected at right angles to the direction of scan by a switching pulse of square wave form applied to the deflecting means of the cathode ray tube to produce said composite beam.

One form of apparatus for carrying out one of the methods embodying the invention comprises optical means for projecting on to a bi-refrigingent crystal a scanning raster of a cathode ray tube so that the image of a spot producing the raster transmitted by said crystal is split into two plane polarised beams incident upon the field of particles, further optical means such as a polarising cube for directing the separate beams on to individual photo-sensitive devices and electronic means for converting the output from said photo-sensitive devices into pulses suitable for application to a pulse counter.

The invention can be applied with especial advantage to the counting and sizing of microscopic particles, for example dust particles or cells derived from living matter, such as red blood corpuscles or bacteria.

Applications of the invention will now be described in greater detail, as examples, with reference to the accompanying drawings in which:

Figure 1 shows a general arrangement for a counting system in which use is made of a microscope as described in the co-pending patent application referred to, Figure 1a is a diagram of a combined pulse produced in the arrangement shown in Figure 1.

Figure 1B:
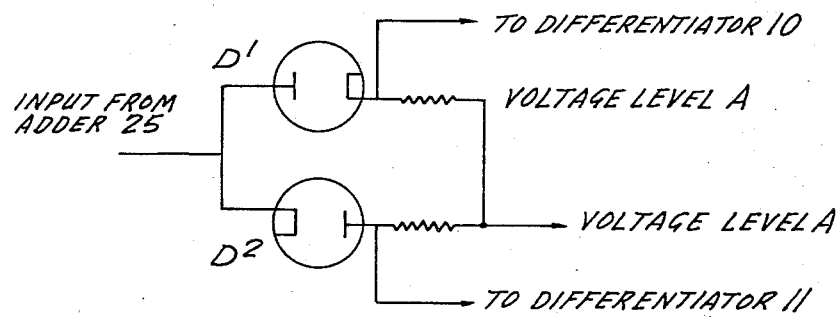
Figure 1C:
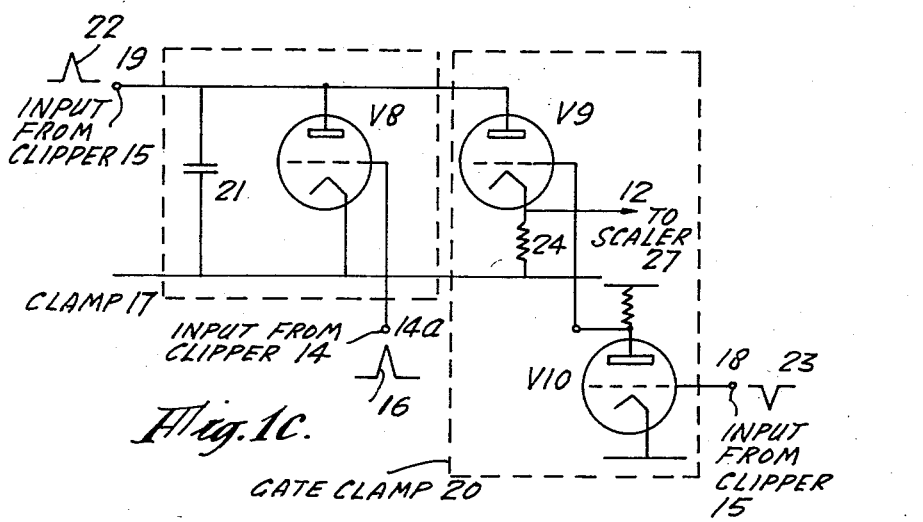
Figure 7:
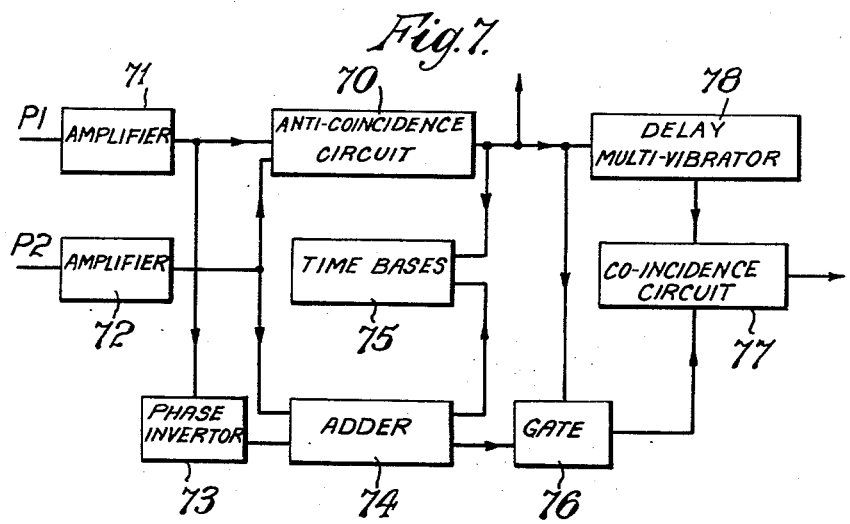

Figure 1b is a circuit diagram of the gate circuit component of the arrangement of Figure 1, Figure 1c is a circuit diagram of the clamp and gate clamp components of the arrangement of Figure 1, Figure 2 represents a field of view containing an assemblage of particles to be counted and/or sized, Figures 3 and 4 are explanatory diagrams representing individual particles and the scanning spots, Figure 5 is a block diagram of an anti-coincidence circuit, Figure 6 is a detailed diagram of an anti-coincidence circuit, Figure 7 is a block diagram of a particle sizing system, Figures 8A to 8D are further explanatory diagrams, Figure 9 shows a set of wave forms which apply to the operation of the system shown in Figures 7.

Figure 10:

Figure 10 shows a form a scanning beam which may be used in carrying out the invention.

Referring to Figure 1, the reference numeral 1 represents a cathode ray tube having the usual electron gun and beam deflecting means (not shown in the drawing) the electron beam being caused to scan the screen of the tube in a raster of horizontal lines. The screen is situated in front of the eye-piece of a microscope 2 in the object plane of which is mounted a transparent slide 3. At a suitable point in the optical system, for example between the objective of the microscope and the slide 3, there is mounted a birefringent, for example, calcite, crystal 4. The tube 1 is so located that, were it not for the presence of the crystal 4, a reduced image of the spot of light produced on the screen of tube 1 would be formed in the plane of the slide 3. Owing to the presence of the crystal 4, however, the image is split into two image beams 5 and 6 polarised in planes at right angles to each other.

After passing through the slide 3, the beams 5 and 6 fall on an appropriate device 13, for example a polarizing cube, having the property of transmitting light polarized in one plane and reflecting that polarized in the perpendicular plane. Hence the device 13 causes the beams 5 and 6 to be propagated in different directions, beam 5 being detected by a photocell 7 and beam 6 by a photocell 8. The outputs of these cells are fed to an electronic circuit whose components, and the wave forms issuing from these components, are shown schematically in Figure 1.

Referring now to Figure 2 which represents an assemblage of particles on the slide 3, the spot composed of beams 5 and 6 scans the field of view 3 in a raster of horizontal lines. Three successive positions of the beams as they cross a particle 9 are shown at 5a, 6a, 5b, 6b, and 5c, 6c, respectively. It will be seen that at any instant four conditions are possible:

(a) beam 5 intercepted by the particle and beams 6 not intercepted (5a, 6a)

(b) both beams intercepted (5b, 6b)

(c) beam 6 intercepted, beam 5 not intercepted (5c, 6c)

(d) neither beam intercepted.

Assuming that the effect of interception of a beam is to raise the voltage output of the photocell which detects that beam, the output pulses p1, p2 from the photocells when the beams are at 6b, 5b, are as shown in Figure 1. These pulses are fed to an adder circuit 25 which combines them and feeds the composite pulse p3 to a gate circuit 26. The latter separates the composite pulse again into two pulses which are applied to separate output differentiating circuits 10 and 11. It should be noted here that, depending on the shape of that part of the particle which is being scanned, the pulses from photocells 7 and 8 will in general be of different duration, and that either may be the one of longer duration. The object of first combining the pulses and then separating them again by the adder and gate circuits 25 and 26 respectively, is to ensure that, whichever pulse is the longer, that pulse will appear in circuit 11, while the shorter pulse appears in circuit 10. The composite pulse p3 is illustrated more clearly in Figure 1a and the gate circuit 26 is shown in Figure 1b. As will be seen from Figure 1a, the composite pulse p3 comprises two portions, there being a first portion below the voltage level A and a second portion above the voltage level A. The gate 26 comprises two diodes D1 and D2 connected as illustrated to form two clipper circuits, one of which (D1) passes to the differentiating circuit 10 only the part of the composite pulse above the voltage A and the other (D2) passes to the differentiating circuit 11 the part of the composite pulse below the voltage A.

Under condition (a) mentioned above the only signal present is from one of the photocells, so that the level of the pulse p3 does not exceed that of the voltage level A and a signal is transmitted only to the differentiator 11. Under condition (b) signals are generated by both photo-cells and are transmitted by the gate 26 to the differentiators 10 and 11 respectively. Under condition (c), one signal is received from one of the photo-cells and the level is below the voltage level A, so that no output signal from the gate 26 is transmitted to the differentiator 10. Under condition (d) no signals are generated by the photo-cells and there is therefore no output from the gate 26 to either of the differentiators 10 and 11.

The pulses issuing from the gate circuit 26 are differentiated in the circuits 10 and 11 to produce positive leading edge and negative trailing-edge pulses 10d, 11d, which are fed to clipper circuits 14 and 15. Circuit 14 is arranged to remove the negative trailing-edge pulse and pass the positive leading-edge pulse 16. The output of the clipper circuit 14 is fed over lead 14a to a clamp circuit 17 which is rendered conducting on receipt of the pulse 16. The clipper circuit 15 has two outputs which appear on leads 18 and 19 and which are fed respectively to a gate clamp circuit 20 and a memory condenser 21. A branch of the lead 19 is also fed to the gate clamp circuit 20. The clipper circuit 15 is arranged to pass the leading edge pulse 22 to the lead 19 and the trailing-edge pulse 23 to the lead 18. The pulse 22 charges the condenser 21, and also pre-sets the gate clamp circuit 20 in such a manner that the latter is rendered conducting by the pulse 23, so as to discharge the condenser through a load resistance 24, thus generating a voltage at the point 12. If, however, a pulse 16 occurs in the interval between pulses 22 and 23, the condenser 21 is discharged through clamp 17, so that the subsequently occurring pulse 23 does not result in a voltage at the point 12.

One specific circuit diagram of the gate clamp 20 and clamp 17 is shown in Figure 1c, from which it will be seen that the clamp 17 comprises a triode V8, to the grid of which is connected the lead 14a and having its anode connected to lead 19, the triode V8 being virtually in parallel with the condenser 21. The gate clamp 20 comprises a first triode V9 having its anode connected to lead 19 and having the load resistance 24 connected in its cathode circuit, the output being taken directly from the cathode of V9. The grid of V9 is connected to the anode of a second triode V10 to the grid of which the lead 18 is connected.

In operation of the circuit of Figure 1c when a pulse 22 is applied over lead 19, the condenser 21 is charged and the triode V9 conditioned for actuation when the triode V10 is rendered conducting by a pulse 23 applied to the grid thereof over lead 18. The triode V9 then conducts and an output voltage is developed across the resistance 24. If a pulse 16 occurs between the pulses 22 and 23 however, this pulse is applied over lead 14a to the grid of V8, which is thereby rendered conducting and discharges the condenser 21 so that when the pulse 23 is applied to V10, V9 does not conduct and no output voltage is developed across resistance 24. Hence the four possible conditions referred to above under (a)—(d) determine the following outputs at the point 12:

(a) maximum voltage
(b) no voltage
(c) maximum voltage
(d) no voltage.

It follows that an output is obtained when and only when the beam 5 and 6 scan the top edge and the bottom edge of a particle. Hence the number of output voltage pulses obtained at 12 is substantially equal to twice the number of particles present in the field of view. These pulses are therefore fed to a scaler circuit 27 which reduces their number by half, and the output of this scaler is fed to a counter 28. The foregoing assumes that each particle is a perfectly homogenous unit on a perfectly homogeneous background. Divergences from this ideal can, however, be accounted for, within limits, by suitably designing the counting circuit; for example, in the circuit shown, by rendering the counter insensitive to pulses significantly less or significantly greater than a given amplitude.

It will be understood from a consideration of Figure 2 that, in order to obtain an accurate count, it is necessary that the separation of the scanning beams 5 and 6 be less than the vertical dimension of the smallest particle to be counted. The separation of the beams may be adjusted by suitably selecting the crystal 4. Likewise the distance between adjacent scanning lines must be substantially equal to this same dimension since if it were smaller, some particle edges would be counted twice while, if it were greater, some edges would not be counted at all. It is not, however, necessary that the scanning lines be straight provided they are substantially parallel. Thus, for example, the scanning may be effected in a continuous spiral having its centre at the centre of the field of view.

While a circuit of the type indicated in Figure 1 for handling the pulses issuing from the photocells affords a fairly high degree of accuracy, simpler circuits may if desired, be used, although this will in general involve a sacrifice of accuracy. Thus, for example, in the simplest case all pulses from one of the photocells are converted to the opposite polarity, and the outputs of both photocells are fed directly to a coincidence circuit giving an output when fed with pulses of the same sign and no output when fed with pulses of opposite signs. While as stated above, this arrangement would be relatively inaccurate in the general case of particles of random shape, it would have almost as good an accuracy as the circuit of Figure 1 if the particles to be counted were all of certain regular shapes, for example having symmetry about a horizontal axis.

A preferred form of pulse examining arrangement will now be described with reference to Figures 3–6 of the drawings. Figures 3 and 4 serve to illustrate a little more clearly than Figure 2 the production of pulses as the scanning spots traverse particles being counted, but in the case of Figures 5 and 6 it will be assumed that the photocell pulses p1 and p2 have been changed from positive to negative going pulses. These pulses are applied respectively to the inputs of an inhibiting circuit 30 and a charging circuit 31, Figure 5. A memory condenser 32 is connected to the output sides of both the circuits 30 and 31 and also to a sampler device 33 which, on its input side, is connected to the charging circuit 31 and on its output side to a counter, not shown.

The memory condenser 32 is charged via the circuit 31 by a pulse derived from the leading edge of the pulse p2 and the charge is sampled by a further pulse derived from the lagging edge of that pulse as will be described in greater detail with reference to Figure 6. The condenser charge is removed by a pulse derived from pulse p1 via the inhibiting circuit 30. If there is coincidence between the pulses p1 and p2, the condenser charge is removed before it can be sampled and no output from the sampling device to the counter is obtained. If, however, there is no such coincidence, there will be an output from the sampling device to the counter and it is for this reason that the arrangement shown in Figure 5 may conveniently be referred to as an anti coincidence circuit.

It will be seen from Figures 3 and 4 that, except at the top and bottom edges of a particle, coincidence between the pulses will occur at all times during the scanning of the particle although a count is registered only when the scanning spots are in the position shown in Figure 4.

The operation of the anti coincidence circuit will now be described in greater detail with reference to Figure 6 in which the valves V1, V2 and diode Ve, with their associated components, constitute the charging circuit 31 of Figure 5, the valves V4 and V5 with their components constitute the sampling device 33 and the diode V6 and valve V7 constitute the inhibiting circuit.

Anode current normally flows through valve V1, the anode lead of which includes an inductance/capacitor combination LC, the effect of which is to produce high constant amplitude output pulses of constant width for all input pulses above a predetermined amplitude, this kind of circuit being known as a peaking circuit. The application of the negative pulse p2 to the control grid of valve V1 produces across the LC combination a positive pulse pp2 at the leading edge, followed by a negative pulse pn2 at the lagging edge. The pulse pp2 is fed through the resistance/capacity coupling shown to the control grid of valve V2, which is of the cathode follower type, to charge a memory condenser C1 (corresponding to condenser 32 of Figure 5) through a cathode resistance R1 and the diode V3, the condenser being charged to approximately peak valve. The charge on condenser C1 is applied to the control grid of valve V4 and is maintained on that grid for a period which is long compared with the width of the input pulse, due to the capacity of C1 and the high reverse resistance of the diode V3 and the bias voltage developed across R2 and applied to diode V6.

The valve V5 normally carries a heavy current and the voltage drop across a resistance R5 in its cathode lead provides sufficient positive bias on the cathode of the valve V4 to maintain this valve normally non-conducting. The anode of valve V1 is resistance/capacity coupled to the control grid of valve V5 and on arrival of the negative pulse pn2 at the control grid the anode current of valve V5 is cut off, so removing the positive bias on the cathode of valve V4. The charge on condenser C1 then becomes effective to cause valve V4 to conduct and an output pulse is produced which is fed to a counter circuit, not shown, connected to the anode of valve V4, thus registering a count of "one."

If, however, there is a pulse, e.g. p1 which is coincident with pulse p2, the application of this coincident pulse to the control grid of valve V7, which is of the cathode follower type, causes the diode V6 to conduct and as the diode anode is connected to the control grid of valve V4 a conductive path to earth is provided via resistance R2, for the charge on condenser C1 which is thus discharged before the sampling pulse pn2 is applied to valve V5. Thus no output is obtained from valve V4 and no count is registered.

Only the top edges of the particles are counted in the method described as it will be seen that if spot 1 is scanning the lower edge of a particle when spot 2 is off the particle, only an inhibiting pulse (p1) derived from spot 1 will be fed to the anti-coincidence circuit.

It is frequently desirable, not only to have a count of the number of particles present in a given field, but also to be able to count particles of particular sizes and the arrangement of apparatus now to be described with reference to Figure 7 and Figure 8a to Figure 8d, enables such sizing of particles to be effected.

Referring to Figure 7, with the exception of the anti-coincidence circuit represented by the block 70 and which preferably takes the form described with reference to Figure 6, the circuit represented by the remaining blocks may be of well known forms to serve their individual purpose. Blocks 71 and 72 represent ordinary forms of pulse amplifiers for the p1 and p2 pulses derived as already described, block 73 represents a phase invertor which is provided so that the output from amplifier 71 is reversed in phase before application with the output of amplifier 72 to a conventional adder circuit represented by block 74. Block 75 represents the usual time base circuits for the field scanning cathode ray tube 1, Figure 1. Block 76 represents an ordinary gate circuit controlling in known manner the connection of the adder circuit 74 to a coincidence circuit represented by block 77. Block 78 represents an ordinary multi vibrator pulse generating circuit which is operated in known manner to generate pulses after a predetermined time delay related to a particular size of particle to be counted. It will be clear to those skilled in the art that the multi vibrator circuit may be operated to generate pulses after any selected delays related to ranges of particle sizes.

Figure 8A:
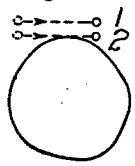
Figure 8B:
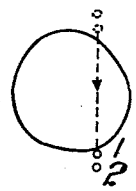

From the description of the operation of the anti-coincidence circuit with reference to Figures 5 and 6 it will be recollected that a pulse representing a count of one is obtained as the output from the anti-coincidence circuit when the top edge of a particle has been scanned as represented in Figure 8A. This output pulse is used in the arrangement shown in Figure 7 to perform four simultaneous but distinct functions. Firstly, it is applied to the horizontal time base circuit in block 75 to stop the horizontal traverse of the scanning beam which then traverses the particle vertically downwards as shown in Figure 8B. Secondly, the output pulse is applied to open the gate circuit 76 and allow the output from the adder circuit 74 to pass to the coincidence circuit 77. Thirdly, the output pulse is applied to the multi vibrator circuit 78 to trigger that circuit which, after a predetermined delay, related to the size of particles to be counted, applies the delay pulse to the coincidence circuit 77. Fourthly, the output pulse is applied to a first counter, which will be referred to as counter No. 1. The output pulse from the coincident circuit 77 is applied to a second counter, which will be referred to as counter No. 2.

Figure 9 shows a set of wave forms in which wave forms 9A and 9B represent the outputs of the amplifiers 71 and 72 respectively, 9C the output from the anti-coincidence circuit, 9D and 9E the two inputs to the adder circuit 74, 9F the outputs of the adder circuit, 9G the input to the time base circuit 75 from the adder circuit 74, 9H the output from the multi vibrator circuit 78 and 9K the output from the coincidence circuit 77.

Figure 8C:
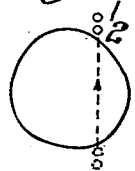
Figure 8D:
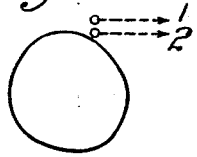

When the two spots are scanning downwards as shown in Figure 8B the resulting pulses fed from the amplifiers 71 and 72 to the adder circuit 74 have equal amplitude and duration but are opposite in phase and delayed in time with respect to each other. The resulting adder circuit output represented by the wave form 9F contains in time section T2 corresponding to the downward scanning sweep, a positive pulse PA, and in time section T3 corresponding to the upward scanning sweep, a negative pulse PB. The trailing edges of pulses PA and PB respectively are shown in exaggerated form in the wave form 9G as pulses PC and PD. At the end of the time section T2, the positive pulse PA closes the gate circuit circuit 76 and the trailing edge thereof represented by the pulse PC, is applied to the time base circuits to reverse the vertical scan of the time base and thereby produce the upward scanning sweep (Figure 8C). At the end of the time section T3, the trailing edge of the negative pulse PB, represented by the pulse PD of wave form 9G is applied to the time base circuits to arrest the upward scanning sweep thereby restoring the horizontal scanning (Figure 8D). If the positive pulse PA and the delayed pulse generated by the multivibrator circuit 78 are coincident in the circuit 77, an output represented by wave form 9K is passed from the coincidence circuit 77 to counter No. 2. The output of the coincidence circuit 77 gives the total number of particles of a particular size on counter No. 2.

If there is provided a number of delay multi vibrator circuits, each having a different delay time related to different sizes of particles to be counted, together with coincidence circuits and counters individual to the multi-vibrator circuits, a particle size analysis can be obtained in a single complete scanning of the field. Such provision of several separate multi vibrator circuits avoids the necessity of repeating the scanning of a given field several times with adjustment each time of the single multi vibrator circuit to the several different delays related to the particle sizes to be selected.

The anti-coincidence circuit described with reference to Figures 5 and 6, while being particularly useful in apparatus for carrying out the present invention, may find various other applications. In general it may be used wherever it is desired to obtain an output for any purpose dependent upon the use of input signal pulses which are not coincident.

Each of the different forms of apparatus described may be used to provide a visual display of the specimen field being examined, for example, being counted or sized, as it will be understood that the output from either of the photo-cells employed will be dependent upon the density of the portion of the spection scanned at any instant. Thus it is only necessary to feed the amplified output of one of the cells to a display cathode ray tube having its time base circuits synchronized with, or common to, those of the cathode ray tube providing the scanning spot, to provide a display of the specimen. Obviously, this is a very useful facility because the display may be reproduced at any convenient magnification for viewing purposes.

Further, in arrangements using an anti-coincidence circuit as described, if the pulse output from such circuit is also used to modulate the display tube, the particle being counted at the incidence of a given pulse will be identified by the appearance of a bright spot on that particle of the specimen reproduced on the display tube. The non-appearance of the bright spot on any displayed particle provides a reliable indication that that particle has not been counted. Again, if two or more such bright spots appear on any displayed particle, it will be apparent that that particular particle has been counted twice or more times.

It will be apparent from the preceding description that the carrying out of the invention involves the use of two vertically spaced scanning spots and the combination of a microscope, calcite crystal and polarising prism affords one method of producing the two spots from a single spot and obtaining the required divergence between them.

In an alternative method of producing two spaced scanning spots from a single electron beam a television type camera tube is used in conjunction with a projection type microscope which serves in known manner to project on to the scan screen of the tube an image of the field to be examined. If the single horizontally scanning spot of the camera tube under the control of the time base circuits is rapidly deflected in the vertical direction at regular periods by applying to the vertical deflection elements of the tube a square switching pulse generated by an oscillator then effectively two scanning beams will be produced as shown in Figure 10 and represented by the interrupted spaced full lines B1, B2.

The output from the camera tube is switched by switching means actuated by the switching pulses from the oscillator to two pulse amplifiers so that one amplifier is fed with the tube output during the periods B1 and the other during the periods B2. The signals from each amplifier are fed to integrating circuits the outputs from which are applied to the charging circuit and the inhibiting circuit respectively of the anti-coincidence circuit of Figures 5 and 6 when a simple count of particles is required, or to the anti-coincidence circuit the phase inverter and the adder circuit of the sizing circuit of Figure 7 when it is required to size the particles.

The method of producing two scanning beams as just described may be applied to the particle counting system described with reference to Figure 1, in which case it will be appreciated that the bi-refringent crystal 4 may be dispensed with and the polarising cube replaced by any optical device which will permit one of the beams to be incident on photo-cell 7 and the other beam on photo-cell 8.

In certain applications of the invention, particularly to cases in which advantage can be taken of the high magnifications obtained with the aid of an electron microscope, the field to be examined is passed in the specimen chamber of the electron microscope and its magnified image is then scanned directly by a composite electron beam produced as described with reference to Figure 10. The magnified image of the specimen is rendered visible by projection upon a fluorescent screen within the microscope as in present practice and this screen is scanned by the composite beam, a photo sensitive device being disposed on the side of the screen remote from the scanning beam. The output from the photo sensitive device is switched to separate pulse amplifiers by the beam switching pulse, the counting or sizing output being obtained as already described with reference to arrangements using a beam of the form shown in Figure 10.

It will be appreciated that the magnified image projected on the fluorescent screen may originate from a transparent or an opaque specimen field, normal optical practice being adopted in the case of an opaque specimen to obtain an image which can be subjected to the electron lens system of the microscope.

For the purpose of examining the surface structure of metals involving counting or sizing of the particles composing the surface, it is necessary in applying the present invention to utilise a metallurgical microscope in conjunction with a cathode ray tube providing a scanning raster as already described. Thus, a calcite crystal is mounted in front of the fluorescent screen of the cathode ray tube providing the scanning raster in order to produce the composite beam which is then passed through an optical system disposed between the crystal and the metal specimen, the optical system containing a semi-silvered plate inclined at an angle of 45 degrees so that the composite beam first transmitted through the plate and then deflected from the specimen will be reflected from the plate in a direction at right angles to the axis of the optical system. The reflected composite beam is then caused to impinge upon a polarising cube which transmits one portion of the composite beam onto one photo electric cell and deflects the other portion of the beam onto a second photo electric cell. The outputs from the two cells may be used in any of the arrangements already described.

We claim:
1. Apparatus for counting discrete microscopic particles in a field of view, comprising in combination a field of the said particles, means for producing a scanning raster for scanning the field of view by two plane polarized beams of light spaced apart in a direction perpendicular to the direction of scan a distance less than the dimension in the said direction of the smallest particle, photo-sensitive electrical devices for intercepting each of said beams after impingement on the field and for producing a pulse at the output of the appropriate photo-sensitive device when a beam is intercepted by a particle, electronic means for combining the output pulse of the photo-sensitive devices to produce a pulse signal when only one beam is intercepted by a particle and to produce no signal when both beams are so intercepted, and counting means operable by said pulse signals, the said electronic means comprising an adder circuit for combining the output pulses from the photo-sensitive devices to produce composite output pulses, a separator circuit for separating each of said composite pulses into a first shorter pulse and a second longer pulse and applying said shorter and longer pulses respectively to a first output circuit and a second output circuit, differentiating means in said first and second output circuits for producing positive leading edge and negative trailing edge pulses, a first clipper circuit in said first output circuit for removing the negative trailing edge and passing the positive leading edge of the pulses to a clamp circuit operable to the conducting condition by such leading edge pulses, a second clipper circuit in said second output circuit and having two outputs connected to a gate clamp circuit one of which outputs is also connected to a memory condenser, the said second clipper circuit being effective to pass leading edge pulses over the said one output to charge the memory condenser and to pass the trailing edge pulses over the second output to the gate clamp circuit to open the gate clamp circuit for discharging the condenser through a load resistor thereby to generate the said pulse signal, the said clamp circuit being connected across the condenser to short-circuit the condenser when the said clamp circuit is operated to the conducting condition by a positive leading edge pulse from said first clipper circuit, whereby a positive leading edge pulse passed by said first clipper circuit and occurring between the leading and trailing edge pulses passed by said second clipper circuit is effective to inhibit generation of a pulse signal by the condenser.

2. Apparatus as claimed in claim 1, in which the said raster-producing means comprises a cathode ray tube, a scanning screen on said cathode ray tube and means for producing a scanning raster for scanning the said screen, a bi-refringent crystal positioned between the field of particles and the scanning screen, and a microscope positioned between the bi-refringent crystal and the scanning screen for projecting on to the said bi-refringent crystal an image of the said scanning raster, whereby the image is split by the bi-refringent crystal to form the said two plane polarized beams.

References Cited in the file of this patent

UNITED STATES PATENTS

| | | |
|---|---|---|
| 2,415,191 | Rajchman | Feb. 4, 1947 |
| 2,427,319 | Weathers | Sept. 9, 1947 |
| 2,443,722 | Carlson | June 22, 1948 |
| 2,494,441 | Hillier | Jan. 10, 1950 |
| 2,661,902 | Wolff et al. | Dec. 8, 1953 |
| 2,789,765 | Gillings | Apr. 23, 1957 |
| 2,791,377 | Dell et al. | May 7, 1957 |
| 2,791,695 | Bareford et al. | May 7, 1957 |